(12) United States Patent
Strens (10) Patent No.: US 8,229,165 B2
(45) Date of Patent: Jul. 24, 2012

(54) PROCESSING METHOD FOR CODED APERTURE SENSOR

(75) Inventor: Malcolm John Alexander Strens, Solihull (GB)

(73) Assignee: Qinetiq Limited, London (GB)

( * ) Notice: Subject to any disclaimer, the term of this patent is extended or adjusted under 35 U.S.C. 154(b) by 841 days.

(21) Appl. No.: 12/373,946

(22) PCT Filed: Jul. 27, 2007

(86) PCT No.: PCT/GB2007/002867
§ 371 (c)(1),
(2), (4) Date: Jan. 15, 2009

(87) PCT Pub. No.: WO2008/012557
PCT Pub. Date: Jan. 31, 2008

(65) Prior Publication Data
US 2009/0279737 A1 Nov. 12, 2009

(30) Foreign Application Priority Data
Jul. 28, 2006 (GB) .................................. 0615040.3

(51) Int. Cl.
*G06K 9/00* (2006.01)
*G01N 23/201* (2006.01)

(52) U.S. Cl. ............................ 382/103; 382/291; 378/87

(58) Field of Classification Search .................. 382/100, 382/103, 106–107, 120–123, 162, 168, 173, 382/181, 191, 199, 207–214, 232, 236, 254, 382/260, 274, 276, 291, 305, 312; 378/87; 359/318, 260, 248, 245; 372/20
See application file for complete search history.

(56) References Cited

U.S. PATENT DOCUMENTS

| | | | |
|---|---|---|---|
| 3,860,821 A | 1/1975 | Barrett | |
| 3,961,191 A | 6/1976 | Stoner et al. | |
| 4,075,483 A | 2/1978 | Tancrell et al. | |
| 4,092,540 A | 5/1978 | Barrett | |
| 4,165,462 A | 8/1979 | Macovski et al. | |
| 4,209,780 A | 6/1980 | Fenimore et al. | |
| 4,954,789 A * | 9/1990 | Sampsell | 359/318 |
| 5,047,822 A | 9/1991 | Little, Jr. et al. | |
| 5,115,335 A | 5/1992 | Soref | |
| 5,294,971 A | 3/1994 | Braunecker et al. | |

(Continued)

FOREIGN PATENT DOCUMENTS

DE 25 28 641 A1 1/1976
(Continued)

OTHER PUBLICATIONS

Jul. 7, 2011 European Examination Report issued in European Application No. 07789073.9.
(Continued)

*Primary Examiner* — Seyed Azarian
(74) *Attorney, Agent, or Firm* — Oliff & Berridge, PLC (57) ABSTRACT

A method of processing for a coded aperture imaging apparatus which is useful for target identification and tracking. The method uses a statistical scene model and, preferably using several frames of data, determines a likelihood of the position and/or velocity of one or more targets assumed to be in the scene. The method preferably applies a recursive Bayesian filter or Bayesian batch filter to determine a probability distribution of likely state parameters. The method acts upon the acquired data directly without requiring any processing to form an image.

15 Claims, 2 Drawing Sheets

U.S. PATENT DOCUMENTS

| | | | |
|---|---|---|---|
| 5,311,360 A | 5/1994 | Bloom et al. | |
| 5,426,312 A | 6/1995 | Whitehead | |
| 5,448,395 A | 9/1995 | Lopez et al. | |
| 5,488,504 A * | 1/1996 | Worchesky et al. | 359/248 |
| 5,500,761 A | 3/1996 | Goossen et al. | |
| 5,519,529 A * | 5/1996 | Ahearn et al. | 359/248 |
| 5,552,912 A | 9/1996 | Sharp et al. | |
| 5,579,149 A | 11/1996 | Moret et al. | |
| 5,636,001 A | 6/1997 | Collier | |
| 5,636,052 A | 6/1997 | Arney et al. | |
| 5,710,656 A | 1/1998 | Goossen | |
| 5,772,598 A | 6/1998 | Halling | |
| 5,784,189 A | 7/1998 | Bozler et al. | |
| 5,825,528 A | 10/1998 | Goossen | |
| 5,838,484 A | 11/1998 | Goossen | |
| 5,841,579 A | 11/1998 | Bloom et al. | |
| 5,870,221 A | 2/1999 | Goossen | |
| 5,943,155 A | 8/1999 | Goossen | |
| 5,949,571 A | 9/1999 | Goossen et al. | |
| 5,953,161 A | 9/1999 | Troxell et al. | |
| 5,995,251 A | 11/1999 | Hesselink et al. | |
| 6,034,807 A | 3/2000 | Little et al. | |
| 6,069,361 A | 5/2000 | Rubinstein | |
| 6,195,412 B1 * | 2/2001 | Tobin et al. | 378/87 |
| 6,324,192 B1 | 11/2001 | Tayebati | |
| 6,329,967 B1 | 12/2001 | Little et al. | |
| 6,392,235 B1 | 5/2002 | Barrett et al. | |
| 6,396,976 B1 | 5/2002 | Little et al. | |
| 6,424,450 B1 | 7/2002 | Goossen | |
| 6,430,333 B1 | 8/2002 | Little et al. | |
| 6,467,879 B1 | 10/2002 | Kubby et al. | |
| 6,519,073 B1 | 2/2003 | Goossen | |
| 6,570,143 B1 | 5/2003 | Neil et al. | |
| 6,737,652 B2 | 5/2004 | Lanza et al. | |
| 6,819,463 B2 * | 11/2004 | Noonan | 359/245 |
| 6,819,466 B2 * | 11/2004 | Tayebati | 359/260 |
| 6,856,449 B2 | 2/2005 | Winkler et al. | |
| 7,006,132 B2 | 2/2006 | Pereira et al. | |
| 7,031,577 B2 | 4/2006 | Painter et al. | |
| 7,235,773 B1 | 6/2007 | Newman | |
| 7,251,396 B2 | 7/2007 | Larochelle et al. | |
| 7,415,049 B2 * | 8/2008 | Flanders et al. | 372/20 |
| 2002/0075990 A1 | 6/2002 | Lanza et al. | |
| 2003/0058520 A1 | 3/2003 | Yu et al. | |
| 2003/0122955 A1 | 7/2003 | Neidrich | |
| 2003/0164814 A1 | 9/2003 | Starkweather et al. | |
| 2003/0191394 A1 | 10/2003 | Simon et al. | |
| 2004/0008397 A1 | 1/2004 | Noonan | |
| 2004/0046123 A1 | 3/2004 | Dausch | |
| 2005/0057793 A1 | 3/2005 | Starkweather et al. | |
| 2005/0248827 A1 | 11/2005 | Starkweather et al. | |
| 2006/0038705 A1 | 2/2006 | Brady et al. | |
| 2006/0157640 A1 | 7/2006 | Perlman et al. | |
| 2007/0013999 A1 | 1/2007 | Marks et al. | |
| 2007/0091051 A1 | 4/2007 | Shen | |
| 2008/0128625 A1 | 6/2008 | Lamadie et al. | |
| 2008/0151391 A1 | 6/2008 | Zalevsky et al. | |
| 2008/0259354 A1 | 10/2008 | Gharib et al. | |
| 2008/0285034 A1 | 11/2008 | Gharib et al. | |
| 2009/0008565 A1 | 1/2009 | Gottesman | |
| 2009/0020714 A1 | 1/2009 | Slinger | |
| 2009/0022410 A1 | 1/2009 | Haskell | |
| 2009/0090868 A1 | 4/2009 | Payne | |
| 2009/0167922 A1 | 7/2009 | Perlman et al. | |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| EP | 1 627 526 | 2/2006 |
| GB | 1 449 636 | 9/1976 |
| GB | 2 314 664 A | 1/1998 |
| GB | 2 350 472 | 11/2000 |
| GB | 2 414 881 A | 12/2005 |
| GB | 2 418 028 A | 3/2006 |
| GB | 2 434 935 A | 8/2007 |
| JP | A-55-146411 | * 11/1980 |
| JP | A-58-060723 | 4/1983 |
| JP | A-04-005620 | 1/1992 |
| JP | A-09-113819 | 5/1997 |
| JP | A-2001-218116 | 8/2001 |
| JP | A-2003-4441 | 1/2003 |
| JP | A-2005-202225 | 7/2005 |
| WO | WO 91/12502 A1 | 8/1991 |
| WO | WO 94/18582 A1 | 8/1994 |
| WO | WO 96/24032 A1 | 8/1996 |
| WO | WO 97/26557 A1 | 7/1997 |
| WO | WO 98/46007 A1 | 10/1998 |
| WO | WO 00/17810 A1 | 3/2000 |
| WO | WO 00/45608 A1 | 8/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 A1 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

Feb. 3, 2009 Written Opinion of the International Searching Authority issued in International Application No. PCT/GB2007/002867.

Bertero et al., "Image Restoration Methods for the Large Binocular Telescope (LBT)," Astronomy and Astrophysics, May 30, 2000, pp. 1-15.

Cannon et al., "Coded Aperture Imaging: Many Holes Make Light Work," Optical Engineering, May/Jun. 1980, vol. 19, No. 3, pp. 283-289, (XP-001092857).

De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).

Gutin et al., "Agile, Detecting and Discriminating, infrared Electo-optical System (ADDIOS) Application to Coded Aperture Imaging and Non-Imaging Sensor Systems," Proc. of SPIE, 2007, vol. 6714, pp. 671406-1 to 671406-12, (XP-002558346).

Mohan et al., "Sensing Increased Image Resolution Using Aperture Masks," CVPR, 2008, pp. 1-8, (XP-31297391).

Slinger et al., "Coded Aperture Systems as Nonconventional, Lensless Imagers for the Visible and Infrared," Proc. of SPIE, 2007, vol. 6737, pp. 67370D-1 to 67370D-10, (XP-002558347).

Rocchia et al., "A Multiplex Imaging Spectrometer for Low Energy X-Ray Astronomy," Astrophysics and Space Science, Oct. 1983, vol. 96, No. 2, pp. 361-374.

Grindlay et al., "Optimizing Wide-Field Coded Aperture Imaging: Radial Mask Holes and Scanning," Proc. of SPIE, 2004, vol. 5168, No. 1, pp. 402-410, San Diego, CA, USA, Aug. 4-7, 2003.

Dec. 23, 2009 International Search Report issued in corresponding International Application No. PCT/GB2009/001870.

Mar. 5, 2010 International Search Report issued in corresponding International Application No. PCT/GB2009/002780.

Mar. 19, 2009 Office Action issued in corresponding Application No. GB0822281.2.

Feb. 23, 2010 Office Action issued in U.S. Appl. No. 12/278,528.

Mar. 11, 2010 Office Action issued in U.S. Appl. No. 12/278,521.

Aug. 26, 2009 Office Action issued in U.S. Appl. No. 12/278,528.

Aug. 28, 2006 International Search Report issued in corresponding International Application No. PCT/GB2006/001890.

Aug. 16, 2005 Search Report issued in corresponding Application No. GB0510470.8.

Nov. 8, 2005 Search Report issued in corresponding Application No. GB0510470.8.

Nov. 10, 2005 Search Report issued in corresponding Application No. GB0510470.8.
Oleg. P. Ivanov, "Control and Image Decoding Software for Portable Gamma-Ray Imaging System with Coded Aperture," Nuclear Science Symposium, 1999, pp. 459-463 (with Abstract).
Mar. 29, 2010 Office Action issued in U.S. Appl. No. 12/278,470.
Nov. 18, 2009 Office Action issued in U.S. Appl. No. 11/920,345.
Feb. 25, 2011 Office Action issued in U.S. Appl. No. 12/278,470.
Meng et al. "A Gamma Ray Imager Using Clustered Non-Redundant Array Coded Aperture," 2003 IEEE Nuclear Science Symposium Conference Record, vol. 2 (Oct. 2003), pp. 763-766.
May 7, 2010 Office Action issued in U.S. Appl. No. 11/920,345.
Japanese Office Action dated May 24, 2011 for Japanese Patent Application No. 2008-512909.
Sep. 30, 2010 Office Action issued in U.S. Appl. No. 12/278,470.
Oct. 19, 2010 Office Action issued in U.S. Appl. No. 12/278,500.
Aug. 31, 2010 Office Action issued in U.S. Appl. No. 12/278,528.
Fenimore et al., "Coded aperture imaging with uniformly redundant arrays," *Applied Optics*, Feb. 1, 1978, Vo. 17, No. 3, pp. 337-347.
Cannon et al., "Tomographical imaging using uniformly redundant arrays," *Applied Optics*, Apr. 1, 1979, vol. 18, No. 7, pp. 1052-1057.
Gopinathan et al., "Coded apertures for efficient pyroelectric motion tracking," *Optics Express*, Sep. 8, 2003, vol. 11, No. 18, pp. 2142-2152.
Graziani et al., "Localization of GRBs by Bayesian Analysis of Data from the HETE WXM," AIP Conference Proceedings AIP USA, 2003, No. 662.
Graziani et al., "Determination of X-Ray Transient Source Positions by Bayesian Analysis of Coded Aperture Data," Oct. 8, 1997, pp. 1-6.
Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Conf. 28, pp. 741-748.
Jan. 13, 2012 Office Action issued in Japanese Patent Application No. 2008-512909 (English translation).
Casasent et al., "Real-time deformation invariant optical pattern recognition using coordinate transformations," *Applied Optics*, Mar. 1, 1987, pp. 938-942, vol. 26, No. 5, Optical Society of America, (XP 000601745).
Gmar et al., "Development of Coded-Aperture Imaging With a Compact Gamma Camera," *IEEE Transactions on Nuclear Science*, Aug. 2004, pp. 1682-1687, vol. 51, No. 4, IEEE, (XP 002366988).
Sun et al., "Method for reduction of background artifacts of images in scanning holography with a Fresnel-zone-plate coded aperture," *Applied Optics*, Jul. 20, 2004, pp. 4214-4218, vol. 43, No. 21, Optical Society of America, (XP 002393789).
Busboom et al., "Coded aperture imaging with multiple measurements," *J. Opt. Soc. Am. A*, May 1997, pp. 1058-1065, vol. 14, No. 5, Optical Society of America, (XP 002431989).
Mertz et al., "Fresnel Transformations of Images," *Proceedings of the Conference on Optical Instruments and Techniques*, London 1961, Ed. K.J. Habel, 1961, pp. 305-312, (XP 002432814).
Tam et al., "Spatial-light-modulator-based electro-optical imaging system," *Applied Optics*, Feb. 10, 1992, pp. 578-580, vol. 31, No. 5, Optical Society of America, (NP 000247290).
Goossen et al., "Silicon Modulator Based on Mechanically-Active Anti-Reflection Layer with I Mbit/sec Capability for Fiber-in-the-loop Applications," *IEEE: Photonics Technology Letters*, Sep. 1994, pp. 1119-1121, vol. 6, No. 9, IEEE, (XP 000468079).

Accorsi et al., "High-Sensitivity Dynamic Coded Aperture Imaging," *2003 IEEE Nuclear Science Symposium Conference Record*, vol. 5 of 5, Oct. 19, 2003, pp. 1833-1837, vol. 13, IEEE.
Brown, "Multiplex imaging with multiple-pinhole cameras," *Journal of Applied Physics.*, Apr. 1974, pp. 1806-1811, vol. 45, No. 4, American Institute of Physics.
Monnelly et al., "HETE Soft X-ray Camera Imaging: Calibration, Performance, and Sensitivity," *AIP Conference Proc.*, 2003, pp. 49-55, American Institute of Physics.
Wood et al., "Hybrid optics in dual waveband infrared systems," *Proc of. SPIE*, 1998, pp. 602-613, vol. 3482.
Fish et al., "Scanning singular-value-decomposition method for restoration of images with space-variant blur," *J. Opt. Soc. Am. A*, Mar. 1996, pp. 464-469, vol. 13, No. 3, Optical Society of America.
Lewis et al., "Micromachined Modulator Arrays for Use in Free-Space Optical Communication Systems," *Advanced Free-Space Optical Communications Techniques and Technologies, Proc of. SPIE*, vol. 5614, pp. 24-30, 2004.
Moseley et al., "Microshutters Arrays for the JWST Near Infrared Spectrograph," *Proceedings SPIE, International Society for Optical Engineering*, 2004, vol. 5487, Part 2, pp. 645-652.
Kutyrev et al., "Programmable Microshutter Arrays for the JWST NIRSpec: Optical Performance," *IEEE Journal of Selected Topics in Quantum Electronics*, May/Jun. 2004, vol. 10, No. 3, pp. 652-661.
De Villiers et al.; "Positive solutions to linear inverse problems," *Inverse Problems*, 1999, pp. 615-635, vol. 15, IOP Publishing Ltd.
U.S. Appl. No. 60/726,655, filed Oct. 17, 2005 in the name of David Brady.
U.S. Appl. No. 12/278,528, filed Aug. 6, 2008 in the name of Douglas Payne.
U.S. Appl. No. 12/278,515, filed Aug. 6, 2008 in the name of Philip Haskell.
U.S. Appl. No. 12/278,470, filed Aug. 6, 2008 in the name of Christopher Slinger.
U.S. Appl. No. 12/278,500, filed Aug. 6, 2008 in the name of Mark McNie et al.
U.S. Appl. No. 12/278,521, filed Aug. 6, 2008 in the name of Christopher Slinger.
U.S. Appl. No. 12/278,524, filed Aug. 6, 2008 in the name of Christopher Slinger et al.
U.S. Appl. No. 60/792,335, filed Apr. 17, 2006 in the name of David Brady et al.
Jul. 19, 2011 Office Action issued in Japanese Patent Application No. 2008-552892.
Mar. 5, 2010 Written Opinion of the International Searching Authority issued in Patent Application No. PCT/GB2009/002780.
Jan. 12, 2011 Office Action issued in U.S. Appl. No. 12/278,528.
M. Bertero & P. Boccacci, "Introduction to Inverse Problems in Imaging," Institute of Physics Publishing, 1998, p. 106-113; 174-183; 288-294.
Sep. 14, 2010 Office Action issued in Japanese Patent Application No. 2008-512909 (translation).
G. Indebetouw, "Scanning Heterodyne Reconstruction of Coded Aperture Images," Optics and Laser Technology, vol. 18, No. 5, pp. 268-272, Oct. 1, 1986.
Mar. 6, 2012 European Office Action issued in European Application No. 07 705 142.3.

* cited by examiner

Figure 1

To machine
(automated
surveillance, detection,
identification, tracking
etc.)

To display(s)
and
human(s)

Figure 2

Fig 2a
Full FOR imaging mode

Fig 2b
High resolution imaging mode

PROCESSING METHOD FOR CODED APERTURE SENSOR

This invention relates to the processing of signals obtained using a coded aperture apparatus, especially to a method of detecting and/or tracking one or more targets using data received from a detector array in a coded aperture apparatus.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics, Vol. 17, No. 3, pages 337-347, 1 Feb. 1978. It has also been proposed for three dimensional imaging, see for instance "Tomographical imaging using uniformly redundant arrays" Cannon™, Fenimore EE, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution but increasing the number of apertures increases the radiation arriving at the detector thus increasing the signal to noise ratio. Each aperture passes an image of the scene to the detector array and so the pattern at the detector array is the interference pattern from an overlapping series of images and is not recognisable as the scene. Processing is needed to reconstruct the original scene image from the recorded data.

The reconstruction process requires knowledge of the aperture array used and system configuration and the aperture array chosen is often coded to allow subsequent good quality image reconstruction. The processing is performed using a mathematical model of the particular array at a set location.

Coded aperture imaging can be thought of as a geometric imaging technique and for the applications it is usually used for, e.g. astronomy, diffraction is negligible.

Recently, see our co-pending UK patent application GB0510470.8, the present inventors have proposed using a reconfigurable coded aperture imager having a reconfigurable coded aperture mask means. The use of a reconfigurable coded aperture mask means allows different coded aperture masks to be displayed at different times. This allows, for example, the direction and FOV of the imaging system to be altered without requiring any moving parts. Further the resolution of the imaging system can also be altered by changing the coded aperture mask displayed on the coded aperture mask means.

The pattern displayed on the coded aperture mask means is a coded aperture mask and at least part of the coded aperture mask is a coded aperture array. That is either the whole pattern displayed on the mask means is a coded aperture array or only part of the pattern is a coded aperture array. For the avoidance of doubt the term aperture used herein does not imply a physical hole in the mask means but merely an area of the pattern which allows increased radiation to reach the detector.

As mentioned the reconfigurable mask means can display a variety of coded aperture masks having a variety of coded aperture arrays in different positions on the mask means. The field of view of the imaging system can be altered by changing the position of the coded aperture mask on the array relative to the detector and the resolution can be altered by changing the size of the coded aperture array. Knowledge of the particular array displayed and its location is used in reconstructing the scene image in the same way as for a fixed coded aperture.

GB0510470.8 teaches a versatile and lightweight imaging system that can be rapidly configured to have different fields of view or resolution without any moving parts. It eliminates the need for conventional optics, gives conformal imaging capability, can have an infinite depth of field and gives inherent power free encryption since decoding of the image requires knowledge of the coded aperture array used. The imaging apparatus described therein is particularly suitable for several imaging and surveillance applications in the visible, infrared or ultraviolet wavebands.

However, high resolution imaging requires small aperture sizes and a longer optical path from the detector to the mask, which increases the effects of diffraction. Diffraction causes a blurring of the pattern formed by the mask on the detector array, which can reduce the signal to noise level and affect image quality, especially with conventional processing schemes.

It is an object of the present invention to provide a method for processing the signal from a coded aperture apparatus to provide accurate target location and/or tracking within a scene. As used in this specification the term target means any desired object which it is wished to detect or track in a scene, for example this could be people for a security surveillance system or vehicles in a traffic monitoring system. In a search and rescue environment the targets may be people or boats/other vehicles.

Thus according to the present invention there is provided a method of locating/detecting a target in a scene comprising the steps of taking data acquired from a detector array arranged to receive radiation from the scene via a coded aperture array and determining a likelihood for the location of one or more targets assumed to be present in the scene using the acquired data and a statistical scene model.

The present invention therefore operates using the acquired data directly, i.e. the data received at the detector array in the coded aperture system, and the likelihood for the location of a target is determined using the acquired data which has not been processed to form an image. As mentioned above the signal received at the detector array can be thought of as a series of overlapping images, one from each aperture in the array. The total detector signal therefore has a spatial intensity pattern which is dependent on the scene being imaged and the coded aperture array used but which is not an image of the scene.

In conventional coded aperture imaging the detected intensity pattern is processed to form an image, for instance by applying a suitable deconvolution. Once an image has been formed standard image processing techniques can be applied to the processed image data to detect image features etc.

The present invention however uses the signal as recorded by the detector array and determines the likelihood of the locations of one or more targets assumed to be present without processing the data to form an image. The method of the present invention uses a statistical model of the scene to infer parameters (often referred to as a state) that describe the scene, including the position and/or velocity of any targets in the scene. In simple terms the method models possible target positions and/or velocities and determines the likelihood that the signal received at the detector array was due to a target being located at a particular part of the scene.

The present invention exploits the fact that processing the information recorded at the detector array to form an image will generally result in a loss of information. A loss of information occurs because the resolution (angle of the scene subtended by a pixel) of an image that is formed by conventional processing is limited by the amount of memory and computational resources that are available. Also, conventional processing requires the choice of "regularisation" parameters that balance noise cancellation/smoothing against sharpness; making a choice about the value of these parameters implies a loss of information in the resultant image when compared with the information available in the measured signal. The accuracy of target localisation in the formed image is unlikely to be much better than the pixel spacing. Working directly with the signal recorded by the detector array avoids this loss of information in target detection and tracking and potentially in many other sensing functions.

The method of the present invention takes the data directly acquired by the detector array and interprets it under a statistical scene model. The scene model is a generative statistical model of the signal at the detector array due to the objects (and surfaces etc) that are assumed (or are known) to form the scene, i.e. it is a model of the signal at the detector array from modelled entities within the scene. A scene model consists of two parts. The first part is the set of possible states. The state is a set of parameters describing objects in the scene, their motion, or other attributes or properties of the scene as a whole such as parameters of a geometric transformation describing its motion. The second part of the scene model is a function that, given any detector signal and any state, provides a probability that the particular signal would be obtained conditional upon the particular state.

The model may include elements modelling the propagation of radiation from the entities in the scene to the coded aperture array and propagation through the coded aperture array to the detector array. It may also include a model of the detector. The model therefore accounts for atmospheric attenuation, diffraction effects, spectral effects, detector performance etc.

For instance imagine the data is acquired from a coded aperture system having a thermal infrared detector array with a fixed field of view arranged to view the sky for aircraft (targets). The sky is generally a uniform cold background whereas the targets are heat sources, i.e. are high intensity sources to the infrared detector array. The state will describe the possible positions of targets in the scene and optionally also possible target attributes such as size, shape, orientations etc., which may have prior probabilities based on assumptions about known targets and target behaviour. The first part of the statistical scene model will therefore be the set of possible states. If a target of known size, shape, orientation and intensity is assumed to be at a particular part of the scene it is possible to estimate the signal that would be expected from that target, given knowledge of the particular coded aperture array used when the data was acquired. Therefore the second part of the scene model calculates the probability that the particular signal was obtained from each possible state. The statistical model must allow for various forms of uncertainty including thermal noise at the detector and any unmodelled signal effects which may include clutter in the scene, diffraction and reflection. (These effects instead may be modelled, in which case they do not need to be 'explained away' as noise.)

The invention works by evaluating the probability of the signal under the scene model at multiple states. The application of Bayes rule allows probabilities of signal given state to be interpreted as probabilities of state given signal (up to some unknown normalising constant). Therefore a probability distribution can be obtained over the chosen set of states. The state with maximal probability is the maximum likelihood (most likely) one, but the distribution as a whole is useful as an input to higher level processes or for the information update stage of a tracking process.

The invention can apply Bayesian inference to a single frame of data and the set of states will include one or more possible targets or possible parts of the scene. The most likely state determined by the method will therefore indicate the most likely position or positions of one or more targets assumed to be in the scene. The method of the present invention can however combine several frames of data to improve accuracy, especially with a target which is moving relative to the scene. Thus the method can apply recursive Bayesian filtering or Bayesian batch processing to a sequence of frames. The skilled person will be aware that recursive Bayesian filters have been used for tracking applications previously. For instance recursive Bayesian filters have been applied to the data from conventional imaging systems (and so applied to image data) to track targets.

The basic idea of using a recursive Bayesian filter, a sequential form of Bayesian inference, is to model possible evolving state (e.g. target attributes including velocity) and to update the uncertainty distribution over states as more information is acquired, i.e. more frames of data are captured, so as to reduce the uncertainty in state (e.g. increase the accuracy of target location). In the case of Bayesian filtering, an additional (third part) of the scene model is required. This is a dynamics model which accounts for the evolution of state over time: for example the way a moving target's position changes as a function of its velocity. This dynamical model can be stochastic. i.e. the transition from one state to the next is a probabilistic process. The method described therefore determines the most likely state parameters, e.g. the position and motion of a target assumed to be in the scene. To determine whether a target is actually present or not would require an additional step. For instance a measure of signal strength could be used to determine whether there is indeed a target present; effectively the confidence in the most likely state is thresholded. Other rules could be applied however such as an indication of motion relative to the scene background being a good indicator that a target is present. Multiple target tracking is achieved by extending the state to contain the parameters for multiple targets and to ensure there is some competition or data association mechanism to encourage each parameter group to converge onto a different target. These data association and competition mechanisms are well explored in conventional target tracking literature.

The present invention therefore offers a direct method of processing data obtained using a coded aperture system without requiring an image to be formed. As the method works on the direct signal the accuracy of tracking and target localisation can improved as compared to methods operating on the image processed data.

It should be noted that one could process the data from the coded aperture sensor to form images and then apply conventional Bayesian detection/processing to the images. Prior to the present invention indeed this is how one would have applied Bayesian processing to a coded aperture sensor. As mentioned above however processing the images will result in a loss of information which the present invention, by working with the direct data, avoids. Furthermore applying a "full" Bayesian image based approach would be infeasible because it would require an initial processing stage to generate a large sample of super-resolved images rather than a single estimated image, which would have significant impact on memory (space) and processing (time) requirements. The present invention avoids the image processing overheads and can provide more accurate localisation.

The method can estimate the position of one or more targets from a single frame of data, and track the position and motion of one or more targets from multiple frames using the direct signal. If the presence/absence of a target is not determined until information from multiple frames has been taken into account, then a track before detect process will be obtained. This allows detection of targets that are difficult to detect because they have low contrast or are located in cluttered areas of the scene.

The present invention does not constrain the contents of the scene state which may include other information alongside or instead of the parameters of targets. For instance part of the state in the scene model may be a representation of the scene background (rather than only the objects (targets) of particular interest). In other words the scene model may include information about entities which appear in the scene which are not targets—the general background. The obtained background estimate can be exploited for several purposes such as eliminating clutter from the target detection process or forming a composite image of the scene (a mosaic).

For instance imagine that the data is acquired from a detector array fixed relative to a particular scene and the scene has a high degree of clutter, i.e. they may be buildings, vegetation etc. in the scene with a varying degree of contrast. If the method is looking for targets which are highly contrasting to the scene background the contribution from the background could be represented as general noise in the scene model and the targets identified as described—especially if they are moving relative to the scene background. However if the targets are of low/negative contrast and/or there is target like clutter in the scene background, it may be desirable to include known elements of the scene background in the state of the scene model. In effect the known contribution of the modelled background elements will be taken into account in determining the probability that a particular signal which has been received was due to a particular state. In this way the effect of clutter in the scene can be reduced.

Where background is included in the model there may in effect be two parts to the model, a background scene model which is used to determine a background probability for each part of the scene, i.e. a probability that a particular part of the scene corresponds to the background and a target probability model which determines the likelihood of a target. This approach improves the chance of detecting a target because the background model will 'explain away' clutter, preventing it from interfering with the target model's inference process. Effectively, the relative probability between target and background is computed and used to maximise the ability to discriminate between the two. With this method, it is feasible to detect low and negative contrast targets that have relative motion across the scene background.

The part of the scene model which represents scene background may be constructed in various ways. For instance one or preferably more frames of data could be processed to form an actual image of the scene. Key objects, i.e. areas of contrast, in the scene could then be identified and added to the state of the scene model. Note that although image processing may therefore be performed on some data acquired from the detector array this is purely for the purposes of improving the scene model by incorporating background elements—there is no target detection. The method of detecting and/or locating a target of the present invention would then take the unprocessed acquired data and use the scene model to determine the most likely state without doing any image processing.

If the detector array is fixed relative to the scene whilst the data is acquired there will be no apparent motion of the scene. Thus movement of targets relative to the background can be easily detected and, if the scene model includes any background data it can be assumed that the modelled background elements are not moving from frame to frame. However if the detector is moving relative to the scene then the movement of a target will be a function of both the target's actual motion and the relative movement of the detector and the scene and so is a more complicated function. Also, if one includes background elements in the scene model then these will have apparent motion. It may be desirable therefore to determine the relative movement of the detector array to the scene. This could be done by forming an image of the scene from each frame of data and using standard image processing techniques to identify motion of the background, e.g. linear optic flow operators could be applied to the scene images. However the present invention also allows background scene motion to be inferred directly from the data received at the detector array. If part of the state in the scene model describes the motion of the scene background (but not its contents) in the form of parameters for a geometric transformation from one frame to the next, then these parameters may be directly inferred without forming an image. The benefit may be the ability to track the background at a much higher accuracy than would be obtained if an image were formed, for the same reason as a higher target position accuracy is obtained. The estimation of background motion (also known as image registration) is particularly important if the sensor is itself moving, because it allows the effects of this motion to be removed/reduced in subsequent processing stages.

The use of a background scene model and the use of optic flow are compatible within the Bayesian framework: it is possible to estimate scene motion using optic flow. Knowledge of the scene motion supports estimate/updating of the background scene model from a moving sensor system.

As mentioned the state that is inferred can represent various attributes of a target assumed to be in the scene, other entities in the scene or motion of the scene or entities in the scene. As mentioned the state could infer one or more of the position of a target in the scene, the motion of a target and other attributes of a target that are unknown such as size, shape, spectral signature etc. and the state may relate to these attributes for one or more targets in the scene. The state can also describe aspects of the scene such as one or more of the motion of the scene itself, the scene background or the parameters of other entities in the scene or aspects of the scene such as straight edges, corners, surfaces, illumination state, camera parameters etc. These may be included in the state describing a target for target detection/tracking as described above. However the method may be used purely to determine some aspect of the scene without any target tracking or detection. This could be performed to infer some parameters prior to performing a target detection/tracking step or it may be a stand alone process to determine some information about the scene without needing to form an image. Thus generally the method of the present invention relates to directly inferring scene attributes using Bayesian inference directly on the data received by the detector array. Hence in another aspect of the invention there is provided a method of inferring scene attributes comprising the step of taking data acquired from a detector array arranged to receive radiation from the scene via a coded aperture array and performing Bayesian inference on said data directly to infer said attributes. As with the first aspect of the invention the Bayesian inference is applied to data which has not been processed to form an image. The attributes to be inferred may include one or more of parameters describing one or more targets in the scene, motion of the scene, the scene background, parameters of other entities in the scene, aspects of the scene (such as straight edges, corners, surfaces, illumination state, camera parameters).

The Bayesian inference process is performed as described above with respect to the first aspect of the invention, i.e. a statistical model of the scene including uncertainty in said attributes is formed and the probability of state given signal is inferred from the probability of signal given state.

As mentioned the method described above according to the present invention offers a useful detection and tracking method for targets in a scene. However the direct Bayesian method of the present invention is also applicable to accurate tracking even if targets have been detected via another method. For instance an external image based track before detect process can be used to give target detection with relatively coarse localisation and motion information. From any such confirmed detections a dedicated direct tracking filter could be initiated.

Therefore in another aspect of the present invention there is provided a method of tracking an identified target in a scene comprising the steps of taking several frames of data acquired from a detector array arranged to receive radiation from the scene via a coded aperture array and applying a recursive Bayesian filter to the acquired data.

As with the first aspect of the invention the recursive Bayesian filter is applied to the acquired data which has not been processed to form an image of the target or entity of interest. All of the embodiments and advantages described above with respect to the first aspect of the invention are also applicable to this aspect of the invention.

The invention will now be described by way of example only with respect to the following drawings of which.

Coded aperture imaging (CAI) is based on the same principles as a pinhole camera. In a pinhole camera, images free from chromatic aberration are formed at all distances away from the pinhole, allowing the prospect of more compact imaging systems, with a much larger depth of field. However, the major penalty is the poor intensity throughput, which results from the small light gathering characteristics of the pinhole. Nevertheless, the camera is still able to produce images with a resolution determined by the diameter of the pinhole, although diffraction effects have to be considered. The light throughput of the system can be increased by several orders of magnitude, while preserving angular resolution, by using an array of pinholes. Each detector element sees the result of the summation of contributions from the various pinholes, corresponding to each viewpoint of the scene.

Another way of understanding the operating principle of conventional CAI is to observe that this is a purely geometric imaging technique. Light from every point in a scene within the field of regard (FOR) of the system casts a shadow of the coded aperture onto the detector array. The detector measures the intensity sum of these shadows. The coded aperture is specially designed such that its autocorrelation function is sharp with very low sidelobes. Typically pseudorandom or uniformly redundant arrays (URA) (such as described in E. Fenimore and T. M. Cannon, "Coded aperture imaging with uniformly redundant arrays", Applied Optics, Vol. 17, No. 3, pages 337-347, 1 Feb. 1978) are used where a deconvolution or decorrelation of the detector intensity pattern can yield a good approximation to the point distribution in the scene.

Figure 1:
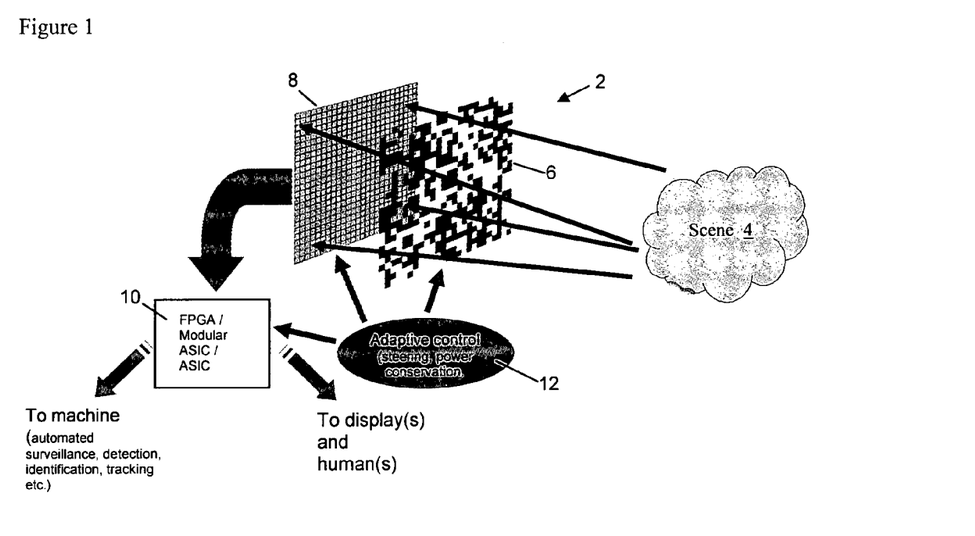
FIG. 1 shows a coded aperture imaging apparatus.

FIG. 1 shows schematically an example of a coded aperture imaging system, generally indicated 2. Rays of light from points in the scene 4 fall onto a particular coded aperture array 6. The coded aperture array acts as a shadow mask and therefore a series of overlapping coded images are produced on the detector array 8. At each pixel on the detector array, the intensities from the overlapping, coded images are summed. The output from the detector array 8 is passed to a processor 10 where image of the scene can be subsequently decoded from the detector signals using a variety of digital signal processing techniques.

Figures 2, 2A, 2B:
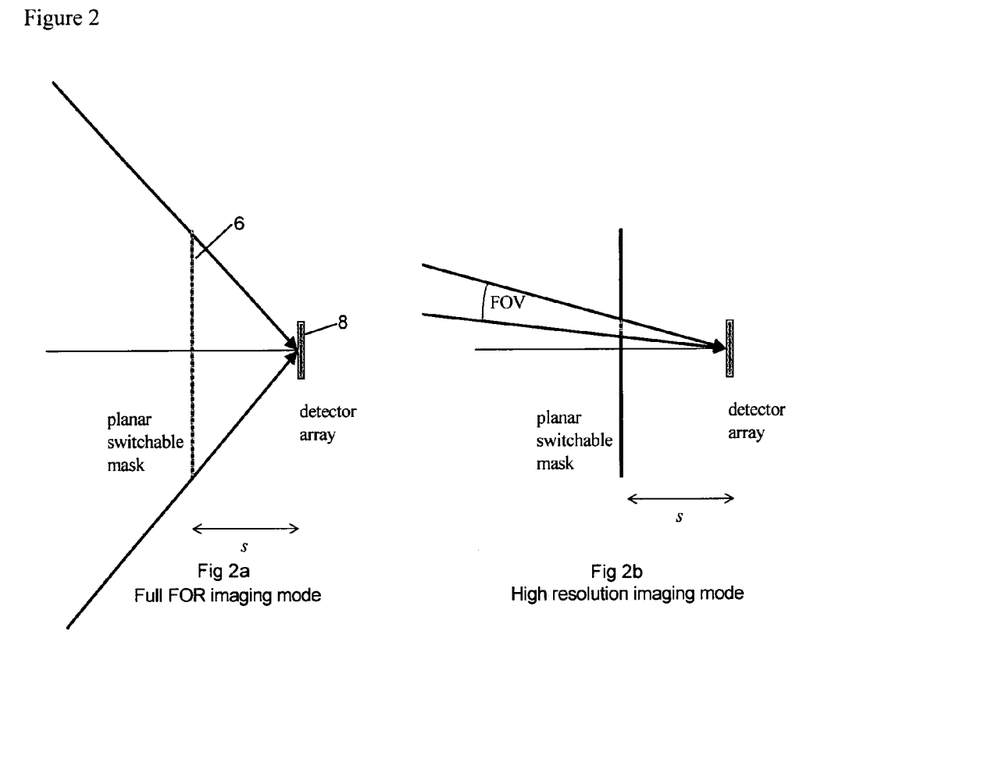
FIG. 2 shows a coded aperture system and illustrates different mask patterns having different fields of view.

Recently GB0510470.8 has proposed using a reconfigurable mask means 6 to provide reconfigurable coded aperture array. The coded aperture mask means 6 is controlled by a controller 12 which controls the reconfigurable mask means to display different coded aperture masks. If only part of the coded aperture mask means displays a coded aperture array, the rest of the mask preventing radiation from reaching the detector, then the field of view of the apparatus is determined by the location and size of the coded aperture array relative to the detector, changing its position or size changes the field of view and/or resolution of the imager. This is illustrated in FIG. 2. In FIG. 2a the whole of the mask is used as a coded aperture array and the apparatus in this case is receiving radiation from the whole field of regard of the system. In FIG. 2b however the majority of the mask is opaque, blocking radiation from reaching the detector array 8. The coded aperture array only forms a small part of the mask and hence only radiation from a restricted field of reaches the detector array. In this mode the apparatus is operating with a narrower field of view but higher resolution.

CAI therefore offers the ability to provide a compact and lightweight imaging apparatus which has a large depth of field and has a changeable field of view without requiring any moving parts.

Note that conventional CAI devices do not generally include any elements with optical power, i.e. lenses, in the optical path. In some applications a CAI imager is being used because a suitable lens material is not available and hence the use of a lens is not possible. The present invention is applicable to a CAI apparatus which does include an element with optical power, such as a lens, in the optical path. The purpose of the lens is not to focus the incident radiation to form a focussed image of the scene—otherwise no CAI processing would be necessary—but simply to provide some degree of optical concentration so that the diffraction pattern is less spread out. As used in this specification therefore the term coded aperture imager should be taken to include an apparatus which has a detector array receiving radiation from a scene via a coded aperture array and also having an optical element such as a lens in the optical path but where the optical element does not form a substantially focussed image of the scene on the detector array. In other words a device which has a coded aperture array in the optical path to provide coding of the signal at the detector array which, using a pattern based on the coded aperture pattern, can be processed to form an unobstructed image of the scene.

Figure 3:
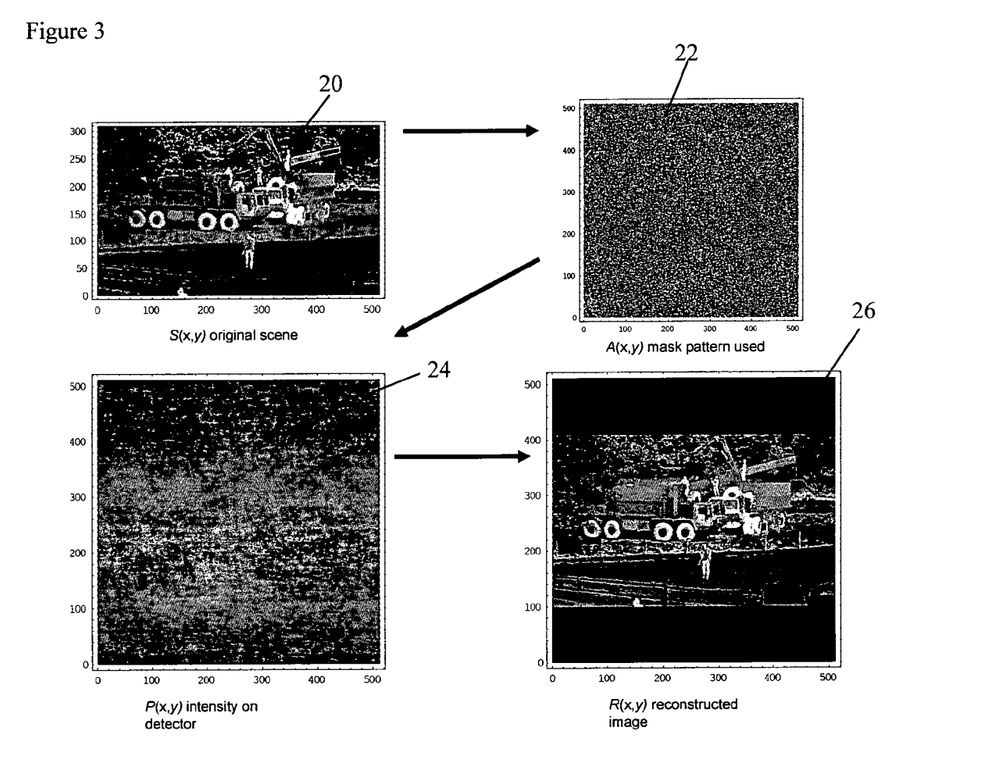
FIG. 3 shows a simulation of a scene, a coded aperture array, the resulting intensity pattern at the detector array and a reconstructed image of the scene.

As mentioned above then, in any coded aperture imager, the intensity pattern formed at the detector array 8 is a series of overlapping images of the scene created by the various apertures. This intensity pattern requires decoding to construct a recognisable image of the scene. FIG. 3 shows a scene 50 and a representative coded aperture array 52. As can be seen by the simulated intensity pattern at the detector array 54, the signal received by the detector is an encoded version of the scene and is not directly recognisable. It has previously been thought that in order to extract useful information from the signal it is necessary to decode the signal recorded at the detector array, usually by means of a deconvolution, and to reconstruct an image of the scene. Image 56 is a reconstructed scene image.

The present invention lies at least partly however in the realisation that for the purposes of automated target detection and/or tracking it is possible to work directly with the signal received at the detector array. Further as no information is lost, unlike in a deconvolution process, target location and tracking using the direct signal can offer improved accuracy over that based on the processed image data.

The invention uses Bayesian inference to determine the location of targets in the scene. The skilled person will be familiar with Bayesian inference but a simplistic description will be given to aid understanding.

Consider that the signal on the detector array, denoted by the random variable S, has a particular form, s. One then is seeking to determine what is the probability distribution across the scene that the signal s arises from a target at that point in the scene, i.e.

$$P(X=x|S=s) \qquad \text{Eqn (1)}$$

where X is a random variable for the state vector representing the target position—and possibly other attributes of the target such as a velocity, size, brightness etc—and x denotes a particular realisation of X. If multiple targets (or other objects of interest including the scene background) are assumed/known to be present, x must also encode these.

Following Bayes theorem $$P(X=x|S=s) = \frac{P(S=s|X=x)P(X=x)}{P(S=s)} \qquad \text{Eqn (2)}$$

The marginal probability P(S=s) is an unknown quantity but is constant (assuming it is non zero) and thus does not affect the relative probability distribution. The prior probability density over states is P(X=x). In a single frame detection process, this encodes any prior knowledge about the likely position (and motion) with which a target could appear. As much prior information as possible about desired targets can be incorporated to improve accuracy.

Thus based on a generative model of the signal resulting from possible target states, P(S=s|X=x), a likelihood model can be generated, P(X=x|S=s).

The generative model can have multiple stages consisting of:
  model of the reflection/emission of photons by the object
  model of atmospheric attenuation
  model of propagation through the coded aperture (mask), including diffraction effects
  model of the conversion by the detector of the photons into a signal.

If the state is target position, this likelihood model gives a probability distribution for the target's position in the scene, given the observed signal. This probability distribution can be used itself as an indicator of possible targets and their location in the scene.

A greater accuracy can be obtained by combining several frames of data. The invention can therefore employ a recursive Bayesian filter with several frames of data. Here an estimate of how the scene will change state over time (from x at time t to x' at time t+1) is given as a dynamics model $P(X_{t+1}=x'|X_t=x)$, which could for example model the motion of a target. The skilled person will be aware of Bayesian tracking filters applied in other tracking applications and how such a filter could be implemented here. The state of the filter is a low-dimensional parameterisation of the target's position, motion and possibly other attributes. The filter works as for a conventional Bayesian tracker (such as a particle filter or Kalman filter) but with a likelihood model that directly interprets the signal at the detector array rather than the reconstructed image. The information update stage of the tracker is therefore identical to equation (1) except that P(X=x) is replaced by a predictive distribution calculated by application of the dynamics model to the posterior distribution from the preceding time steps. This novel approach may provide much better localisation accuracy than could be obtained by working with a reconstructed image, because its accuracy is not limited by any particular choice of image resolution (made in the design of the reconstruction algorithm), which is limited by the memory and processing resources that are available in operation of the sensor. Generally the tracker will be a multi-target tracker that directly fits a mixture of these likelihood models to the observed signal.

For targets that do not have a very high contrast to the local scene background it is desirable to address the contribution of the scene background to the signal as much as possible. In such instances therefore the scene model used within the likelihood computation preferably includes as much information as possible about the scene background.

Additionally or alternatively where there is relative motion between the detector array and the scene it may be advantageous to identify the relative motion of the scene between frames. In conventional image processing this is known as image registration. The idea behind image registration is to find an estimate of the geometric transformation (which may include translation, rotation, expansion, or other effects) of the background between two successive frames. In conventional processing, this transformation (and its uncertainty) can be estimated by application of linear 'optic flow' operators to the sensor image. The direct approach proposed here works directly with the signal received at the detector array rather than an image reconstructed from it. Specifically, given a parameterised family of geometric transformations of the scene and an assumption or estimate for the depth variation in the scene, it is possible to relate the rate of change of each parameter in the transformation to the rate of change of the signal at each detector element. This enables the most likely geometric transformation between two successive observations of the scene to be estimated without ever forming an image. Furthermore, higher-order derivatives can be exploited to provide an estimate for the uncertainty in the geometric transformation.

The method of the present invention has been tested in simulations to prove its validity. One embodiment of the method of the present invention was implemented using Mat-lab™.

To verify the method an exemplar diffraction pattern was computed using a one-dimensional model of a system containing a random mask pattern and an optical element. The internal structure in the diffraction pattern means that although it is spread across multiple detector pixels, a small spatial shift will cause large fluctuations in the received signal. This property is referred to as shift sensitivity and it is desirable for accurate tracking. A two dimensional diffraction pattern was then synthesised from the one-dimensional pattern by assuming linear separability between the 2 axes. (Note that in general this separability property does not hold, but it is expected that the spatial structure in our synthesised 2D pattern is similar to that which would be observed from a full 2D optical model). Test sequences of detector signal frames were synthesised using shifted and sampled copies of this diffraction pattern, according to the target's motion, and with added independent and identically distributed noise in each detector pixel. The noise level was chosen so that the signal level of the correlation filter response was equal to the noise level (i.e. a signal to noise ratio of 0 dB.) These sequences were provided as input to the tracker, and the achieved tracking accuracy was estimated from multiple runs using robust statistics.

Figure 4:
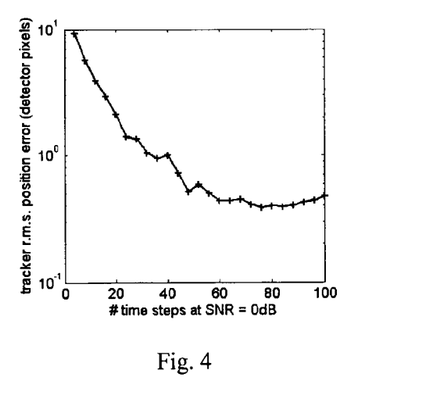
FIG. 4 shows the determined positional error over time, in detector pixels, as the method of the present invention was applied to simulated data.
Figure 5:
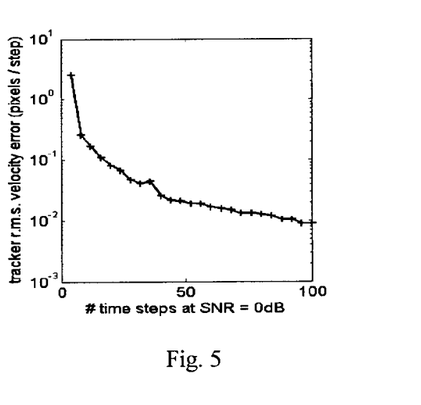
FIG. 5 shows the determined velocity error over time, in pixels per step, as the method of the present invention was applied to simulated data.

The results shown in FIG. 4 and FIG. 5 show that the tracker, over a sequence of observations, builds up confidence in the position and velocity of the target. FIG. 4 shows the root-mean-square positional error of determined location of the target—measured in detector pixels—as a function of the successive steps (frames processed). FIG. 5 shows the root-mean-square error in target velocity as a function of successive steps—measured in detector pixels per step. It can be seen that the measured error drops over time until the determined positional error is less than one pixel and the determined velocity error is less than 0.01 pixel per step. The target has some unknown acceleration and this causes the tracker to reach an equilibrium level of accuracy rather than converge to arbitrary accuracy. These results illustrate that direct target tracking without forming an image is achievable with the CAI. (Note that the inclusion of an optical element in the modelled system affects the spread of the diffraction pattern and hence the signal to noise ratio, but its omission would not change the structure of the tracking algorithm.)

The invention claimed is:

1. A method of locating/detecting a target in a scene comprising the steps of taking data acquired from a detector array arranged to receive radiation from the scene via a coded aperture array, and determining a likelihood for the position of a target assumed to be located in the scene using the acquired data and a statistical scene model, wherein the scene model comprises a set of possible states and a function that determines a probability that the particular signal would be obtained conditional upon the particular state.

2. A method as claimed in claim 1 wherein the likelihood of a target being located in the scene is determined using the acquired data which has not been processed to form an image.

3. A method as claimed in claim 1 wherein the scene model is a generative statistical model of a signal at the detector array due to one or more modeled entities within the scene.

4. A method as claimed in claim 1 wherein the step of determining a likelihood for the position of a target in the scene comprises determining a probability distribution over the set of states.

5. A method as claimed in claim 4 including determining an estimate of motion of a target in the scene.

6. A method as claimed in claim 1 wherein the step of determining a likelihood of a target in the scene combines data from several frames.

7. A method as claimed in claim 6 including applying a recursive Bayesian filter or Bayesian batch filter to several frames of data.

8. A method as claimed in claim 7 wherein the scene model comprises a dynamics model which accounts for the evolution of a state over time.

9. A method as claimed in claim 6 comprising a track-before-detect process.

10. A method as claimed in claim 1 wherein part of the scene model is an estimation of scene background.

11. A method as claimed in claim 1 including the step of estimating scene motion effects.

12. A method as claimed in claim 11 wherein the step of estimating scene motion effects comprises estimating any motion effects directly from the acquired data.

13. A method as claimed in claim 12 wherein the detector array is an array of detector elements arranged to generate respective signals in response to illumination, and the step of estimating scene motion effects comprises comparing rate of change of the signal at each detector element in successive frames with the rate of change of each parameter in a family of parameterised geometric transformations representing possible motions.

14. A method of inferring scene attributes comprising the step of taking data acquired from a detector array arranged to receive radiation from the scene via a coded aperture array and performing Bayesian inference on said data directly to infer said attributes, wherein the attributes to be inferred comprise one or more of parameters describing one or more targets in the scene, motion of the scene, the scene background, parameters of other entities in the scene or aspects of the scene.

15. A method as claimed in claim 14 wherein the Bayesian inference is applied to data which has not been processed to form an image.

* * * * *